United States Patent [19]

Van Drie

[11] 4,185,731

[45] Jan. 29, 1980

[54] APPARATUS FOR COLLECTING SOLID AND LOOSE-WASTE MATERIALS

[76] Inventor: Gerhardt Van Drie, 724 W. Pine Ave., El Segundo, Calif. 90245

[21] Appl. No.: 884,129

[22] Filed: Mar. 7, 1978

[51] Int. Cl.² .................. B65G 65/02; B65G 65/16
[52] U.S. Cl. .................................. 198/304; 198/518; 414/334; 414/518; 414/523
[58] Field of Search .............. 198/506, 512, 514, 518, 198/304, 624, 722, 723, 843, 780, 842; 214/42 R, 83.14, 83, 84; 29/125, 129.5, 130, 131; 193/37; 414/334, 518, 523

[56] References Cited

U.S. PATENT DOCUMENTS

| | | | |
|---|---|---|---|
| 2,729,046 | 1/1956 | Patterson | 198/506 |
| 3,109,648 | 11/1963 | Anderson et al. | 198/723 |
| 3,391,776 | 7/1968 | Hancock et al. | 198/304 |
| 3,422,949 | 1/1969 | Bankauf et al. | 198/304 |
| 3,613,868 | 10/1971 | Rickerd et al. | 198/723 |
| 3,734,318 | 5/1973 | Kraus | 214/83.14 |
| 3,807,982 | 4/1974 | Claassen et al. | 193/37 |
| 3,923,169 | 12/1975 | Van Drie | 214/42 R |
| 4,051,961 | 10/1977 | Williams | 214/83.14 |

*Primary Examiner*—Joseph E. Valenza
*Attorney, Agent, or Firm*—Francis X. LoJacono

[57] ABSTRACT

An apparatus for collecting solid-waste material, the apparatus being arranged to be used in conjunction with a moving collection vehicle, wherein the apparatus includes an improved pick-up means adapted to pick up waste material, whether the material is encapsulated within paper or plastic bag containers, or stacked as loose bundles, such as stacked newspapers or the like, the improvement further including a novel steering device.

8 Claims, 8 Drawing Figures

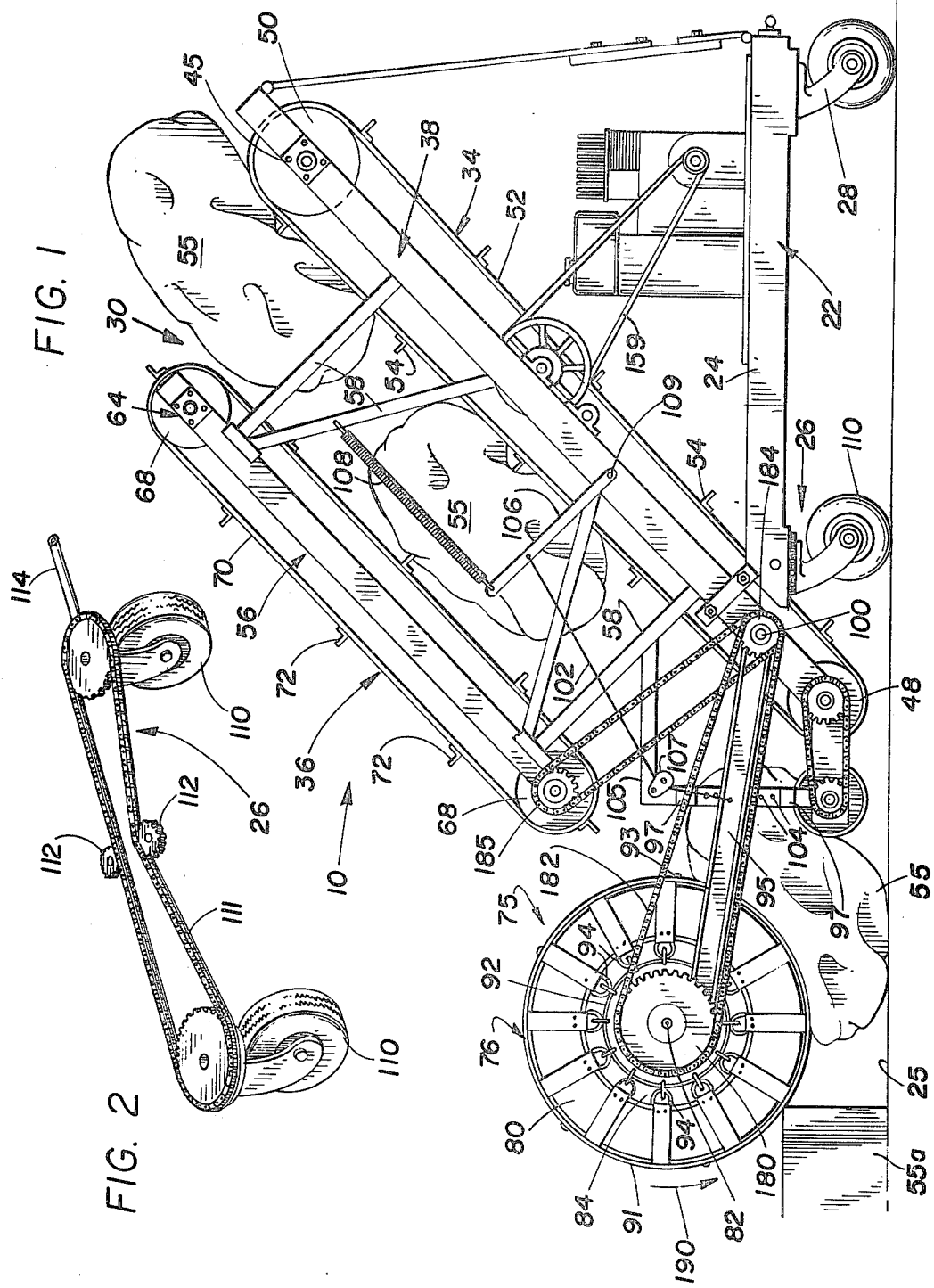

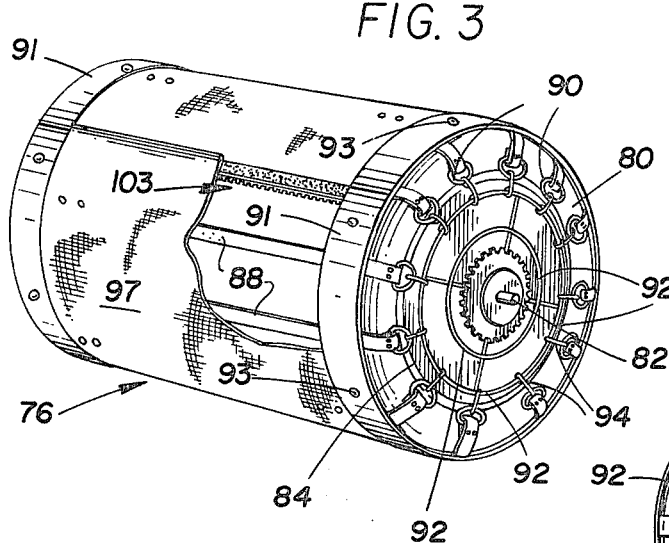
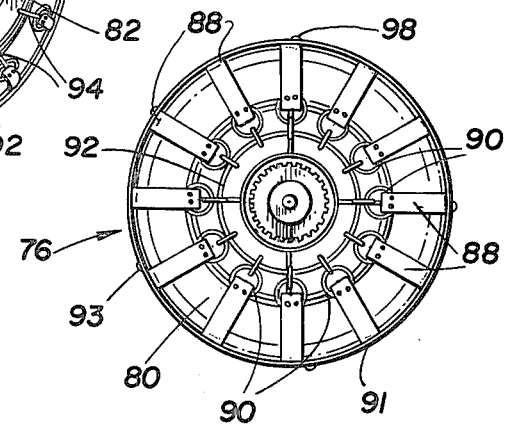
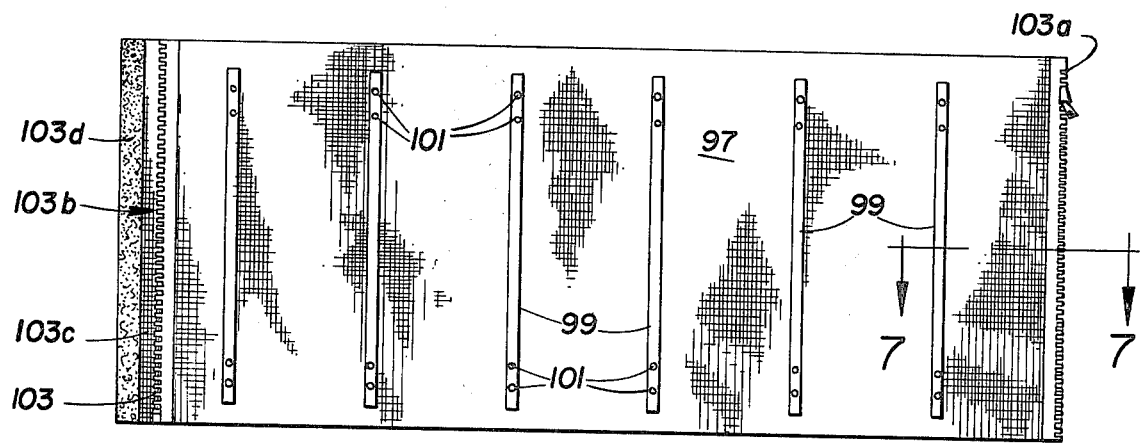
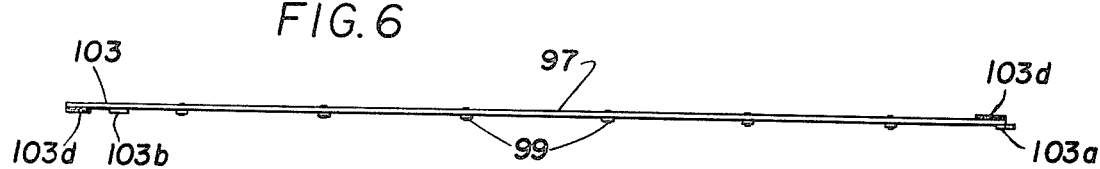
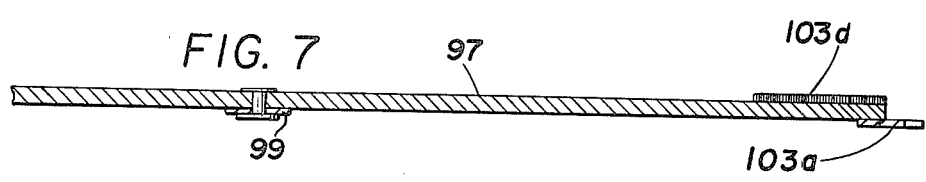

APPARATUS FOR COLLECTING SOLID AND LOOSE-WASTE MATERIALS

BACKGROUND OF THE INVENTION

1. Field of the Invention

This invention relates generally to an apparatus for collecting solid-waste materials and, more particularly, to an improved apparatus for collecting solid and loosely stacked waste materials.

2. Description of the Prior Art

The prior art specifically relating to the presently improved apparatus is shown and described in the U.S. Pat. No. 3,923,169 issued to Gerhardt Van Drie, the applicant of the herein disclosed improved apparatus.

Due to trial and error, it was established that the pick-up means as presented in the above issued patent should be improved so as to not only pick up bag-encapsulated solid-waste material, but also should include an improved means for picking up and collecting loose materials, including stacks of loose newspapers, garden cuttings, and like trash materials that are not held firmly together.

The presently available device has been and is being successfully used, with the exception that it needed improvement in the ability to accept various types of trash and waste material in loose form. Thus, the present improvement has been provided to allow the apparatus broader capabilities as herein stated.

SUMMARY OF THE INVENTION

The present invention discloses an apparatus for collecting and handling both solid and loose-waste materials whereby the various packaged and loose-waste materials are readily and efficiently picked up and collected from the area adjacent the apron portions of streets and highways. The specific improvement is part of the overall collecting apparatus, which is adapted as disclosed in U.S. Pat. No. 3,923,169, to be removably attached to various road-maintenance vehicles, such as trucks and tractors. The collection apparatus comprises a wheel-supported main carriage wherein the wheels thereof can be operated simultaneously to guide the main carriage when separated from a maintenance vehicle. That is, the apparatus is removably attached to a vehicle, wherein the carriage is provided with a pair of support wheels or casters that allow the apparatus to be mobile along with the vehicle to which it is attached, or to be guided or moved when not attached to a vehicle, the wheels being operably interconnected by a chain system to provide simultaneous movement of the associated wheels.

A conveyor-support means is adjustably mounted to the carriage in such a manner that the forward end thereof is positioned just above the roadbed, and extended upwardly and rearwardly to an elevated position. The conveyor-support means includes a pair of frame members, one above the other, herein the lower frame member is also adapted with a conveyor belt, each being operably synchronized in a rearwardly direction so that any waste material interposed between the adjacent oppositely-disposed belts of the conveyors is transported to the upper, elevated, rear-discharge point at the rear end of the carriage.

In order to provide for the necessary loading of both solid and loose material, there is adjustably mounted to the lower, forward end of the frame structure a spring-loaded pick-up means which gently, but positively, picks up and feeds the different types of packaged or loose-waste material directly from the surface of the street as the pick-up means engages each item as it moves forwardly with the trash-collecting vehicle. The loading pick-up means, together with the endless-belt conveyors, are driven by one or more power means synchronously interconnected by a plurality of chain-and-belt drives.

The collection apparatus will be generally attached to a trash-type vehicle (as indicated in the mentioned U.S. Patent) which will be suitable for various street or highway conditions.

OBJECTS AND ADVANTAGES OF THE INVENTION

The present improved pick-up means has for an important object the provision whereby loose-waste material as well as solid-waste material can be readily picked up from the street surface without the loss or accidental displacement of the waste material as it is loaded onto the adjacent conveyors.

It is another object of the invention to provide a means for guiding or steering the apparatus when the apparatus is separated from the trash vehicle.

It is still another object to improve the pick-up means wherein a flexible sheet or cover is secured about the present pick-up means in such a manner as to directly engage and hold the loose-waste material in collective form as it is forced onto the conveyor belts.

A further object of the invention is to provide a device of this character that broadens the operating ability of the existing collecting apparatus as presented in U.S. Pat. No. 3,923,169.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a side-elevational view of a waste-collecting apparatus having the present improvements shown thereon;

FIG. 2 is a diagrammatic, pictorial view of the steering mechanism of the apparatus;

FIG. 3 is a perspective view of the pick-up means;

FIG. 4 is an end-elevational view thereof;

FIG. 5 is a flat-plan view of the pick-up cover member;

FIG. 6 is a side-elevational view thereof;

FIG. 7 is an enlarged, cross-sectional view taken substantially along line 7—7 of FIG. 5.

DESCRIPTION OF THE PREFERRED EMBODIMENT

Figure 8:
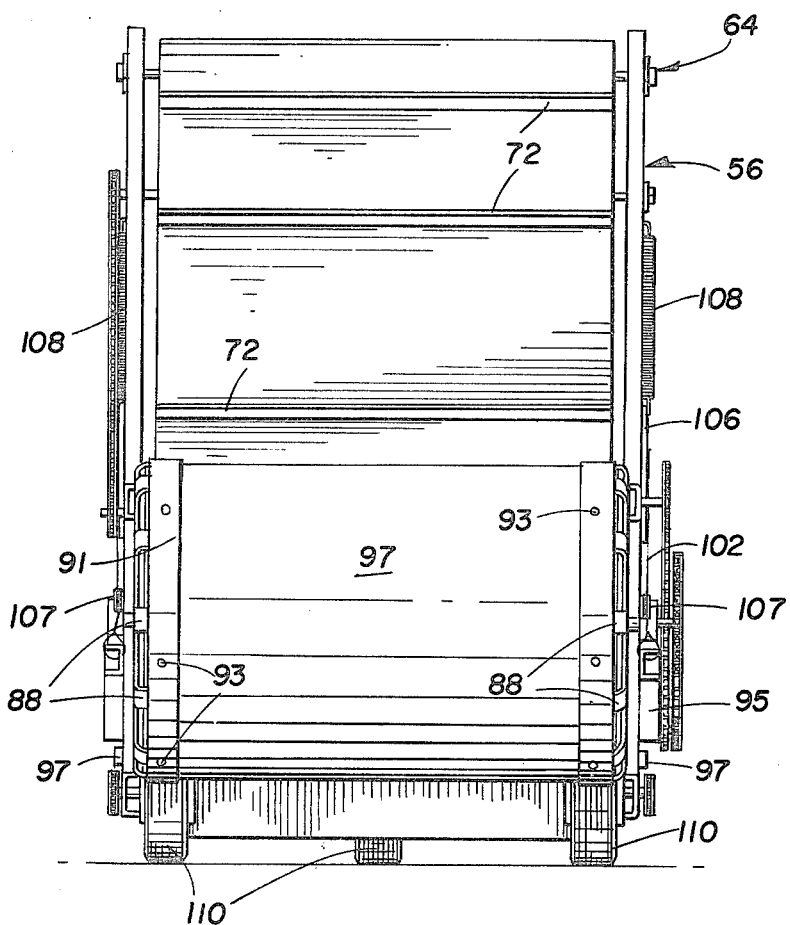
FIG. 8 is a front-elevational view of the waste-collecting apparatus.

Referring to the drawings and more particularly to FIG. 1, there is shown a solid and loose-waste material apparatus, generally indicated at 10. This device is so designed as to be operably attached to a road vehicle (not shown), such as a trash and/or garbage collection truck as indicated in U.S. Pat. No. 3,923,169.

The solid/loose-waste-collecting-and-handling apparatus 10 comprises a wheel-supported undercarriage, indicated generally at 22, which includes a somewhat rectangular frame member 24 movably supported from the ground surface 25 by transporting means which is defined by a steering means 26 positioned forwardly of frame member 24, and a wheel or caster 28 centrally disposed adjacent the rear of frame 24. The steering means will hereinafter be described in detail.

Adjustably mounted to undercarriage 22 and superposed thereon is a conveyor system, generally indicated by numeral 30, said conveyor system comprising a lower conveyor means 34 and an upper conveyor means 36, which are disposed in relatively parallel relationship to each other. Accordingly, each conveyor means is provided with its own frame structure. The first of said frame structures is referred to as the lower frame structure 38 which is adapted to operably support the lower conveyor means 34. Frame structure 38 includes a pair of oppositely arranged side-channel members 40. Mounted to the free ends of frame structure 38 are conveyor drums 48 and 50 which are journaled at 45 therein, the drums being arranged to have an endless belt 52 supported thereover in a continuous manner. Cross rib members 54 are equally spaced longitudinally along belt 52 and traverse the width thereof, to provide a means for carrying the solid and loose-waste material 55 and 55a, respectively, along with the moving belt.

Similarly, the upper conveyor means 36 includes a second frame structure 56, referred to as the upper frame structure, which is fixedly positioned above said first or lower frame structure 38 by struts 58. The free ends of frame structure 56 are provided with bearing means 64 in which conveyor drums 68 are journally supported therein. An endless belt 70 is disposed about the drums in a normal manner, having rib members 72 affixed to the belt in any suitable manner and evenly spaced apart, as seen in FIG. 1.

To provide the necessary loading of the waste material, there is adjustably mounted to the lower, forward end of the lower frame 38 a loading pick-up means, indicated generally at 75. Said pick-up means provides for the rapid yet gentle pick-up of the various types of waste material 55 and 55a, and feeds them between the rotating endless belts 52 and 70 of each respective conveyor means.

The loading pick-up means comprises a pick-up roller 76 wherein the pick-up roller includes a pair of oppositely-disposed wheels or cylinders 80 which are removably attached to a drive axle 82 by means of a hub 84. The wheels 80 are disposed adjacent each end of axle 82, whereby the wheels are spaced apart at least equal to the width of the endless belts. Traversing this defined space there is provided a plurality of flexible pick-up-strap members 88 (see FIG. 3). These straps are equally positioned about wheels 80, thereby defining a somewhat drum-like configuration. It should be noted that the straps will be formed from any suitable flexible material, particularly a rubber-base material. However, other materials, such as various plastics, nylons, fabrics—and in some cases metals—may be used. The straps 88 are shown as flat, elongated, flexible bands stretched from the oppositely-disposed wheels 80. Means are also provided for removably securing the straps to the roller; and this means includes eyelets 90 attached at each free end of the straps which are thereby coupled to either attaching ring 92 by hook means 94. Thus, with two sizes of attaching ring members 92, different degrees of firmness can be provided in each strap 88. A further improvement of the pick-up means includes a radial, annular belt member 91 positioned around the peripheral wall of each wheel and secured to the wheel by bolts 93. This annular belt 91 provides a means to control the position of each strap so as to not tend to move about the radial wall of wheel 80.

With this arrangement, solid-waste materials packaged as indicated at 55 can be readily picked up from surface 25 and fed between the conveyor belts. However, by mounting a continuous sleeve member, defined by flexible sheet or cover member 97, to the outside of the roller 76, as shown in FIG. 3, loose-waste materials 55a as well as solid-waste 55 can be easily and readily fed onto the trailing conveyors, as indicated in FIG. 1.

FIGS. 5, 6 and 7 show details of cover or sleeve 97, wherein cover 97 includes a plurality of flexible metal stays 99 equally spaced apart along the length of the cover and longitudinally disposed substantially across the width of said cover. Stays 99 prevent the cover 97 from collapsing. Thus, as the waste material is engaged with roller 76, both the cover 97 and strap 88 will give—allowing the roller to gently cover each package or stack of material and feed it rearwardly. Especially when loose material engages the cover, it is held together and is prevented from being displaced while it is being rearwardly fed into the adjacent conveyors 34 and 36.

Accordingly, the flexible cover 97 can be made of any suitable material; but it is contemplated that a heavy fabric will be used with spring steel stays as shown in FIG. 5. The stays are riveted at each end of the fabric by rivets 101. In addition, a first fastening means in the form of a zipper 103 is provided along the free edges of cover 97. This allows cover 97 to be positioned around straps 88, as seen in FIG. 3, and connected by each zipper element 103a and 103b, wherein zipper element 103a is affixed along one edge of cover 97, and zipper element 103b is affixed inwardly from the opposite edge to provide an overlapping member 103c. The overlapping member 103c protects zipper 103, wherein the flap is held in place with a second fastening means of Velcro (trademark) strips 103d.

Hence, when the cover is mounted to the pick-up means, it defines a flexible sleeve member as indicated.

The complete pick-up roller 76, as defined, is operably mounted to extended arms 95 which are pivotally connected to the lower portion of frame 38, and is allowed to rest on a stop-block member 97 which is part of a means to control the up-and-down movement of the pick-up means 75. That is, stop members 97 are adjustably attached to a support member 105 having a plurality of adjusting holes 104. Arms 95 are pivotal about shaft 100 to allow pick-up roller 76 to be raised or lowered as it engages the trash materials, as seen in FIG. 1.

To provide a positive operation and a balanced contact between the sleeve 97 and the trash material, a balancing means is connected between the frame structure and the pick-up means 75, wherein this balancing means comprises a pair of oppositely arranged cable members 102, each being connected at one end to arm 95, the other end being connected to a movable lever 106 pivotally mounted to frame 38. Interposed between the end of the cables is a pulley 107 through which the cables pass. Also included is spring means 108 which is affixed to lever 106 and part of the fixed frame structure 58. As the pick-up roller 76 rides over an object, it is kept on a level horizontal plane by the spring load applied to both sides of the pick-up device through cables 102 and levers 106. After the object (trash) is fed rearwardly, roller 76 is gently lowered to a normal position determined by stop member 97. It should be further noted that lever 106 on one side of the frame structure is operably connected to the second lever 106 on the opposite side thereof by a shaft 109 which extends across frame 38, whereby each lever is secured to the shaft, so that when one spring loaded side is activated the corresponding side will also be identically activated thereby.

In addition, a further improvement is provided by steering means 26, which comprises a pair of wheels or casters 110, the wheels being rotatably connected by a chain member 111. Each caster 110 includes a gear plate on which chain 111 is supported (see FIG. 2). When necessary, idle sprockets 112 are positioned to engage chain 111, thereby preventing slack in chain 111. At least one of the casters includes a steering post 114 that allows an operator to rotate the wheels in any direction, the post being formed to receive a steering pole member (not shown).

A power drive is shown as a gasoline-driven engine 154 mounted to the undercarriage, the controls of which are not shown. When engine 154 is operated, it controls the movement of the conveyors and the rotation of roller 76 through a series of interconnecting chains, belts, sprockets and pullies, the typical operation thereof being described in U.S. Pat. No. 3,923,169. However, roller 76 is provided with a sprocket 180 having a chain 182 which is interconnected to sprocket 184 affixed to shaft 100. Thus, one can see that, when conveyor 36 is moving, chain 185 will drive chain 182 and thereby rotate roller 76 in the direction of arrow 190.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A waste-material-handling-and-collecting apparatus for picking up both solid and loose-waste materials, said apparatus having a frame structure, an undercarriage, a conveyor system, and an improved self-adjusting pick-up roller which comprises:
    a pair of cylinders, spaced apart;
    a drive axle having said cylinders removably mounted adjacent each end thereof for rotation therewith;
    a plurality of flexible straps secured with and extending between said cylinders, thereby defining a flexible roller;
    a flexible sleeve member defining a cover to cover over said straps, said cover being removably mounted to said pick-up roller;
    said cover comprises flexible sheet material and a plurality of flexible stay members affixed to said sheet material transversely thereon, whereby said cover is prevented from collapsing;
    means for removably mounting said flexible sleeve to said pick-up roller; and
    means for adjustably mounting said pick-up roller to said apparatus forwardly of said conveyor system.

2. An apparatus as recited in claim 1, wherein said pick-up roller includes:
    means for removably securing said straps to said cylinders; and
    means to prevent lateral movement of said straps, said means being affixed to said cylinders.

3. An apparatus as recited in claim 2, wherein said adjustable means comprises:
    a pair of arm members to which said drive axle is supported on one end thereof, and wherein the opposite ends of said arm members are pivotally attached to said frame structure to allow said roller to be raised and lowered; and
    a balancing means operably connected to said arm members and said frame structure to control the raising and lowering of said roller.

4. An apparatus as recited in claim 3, wherein said balancing means is positioned on each side of said frame structure and wherein said balancing means comprises:
    a cable;
    a lever movably attached to said frame structure, wherein said cable is attached between said lever and said arm member;
    a spring member attached at one end to said lever, and the other end attached to said frame structure; and
    an interconnecting shaft member which connects each oppositely disposed levers so as to move them simultaneously, allowing said roller to be raised and lowered in a level horizontal plane.

5. An apparatus as recited in claim 1, wherein said cover includes oppositely arranged free ends and an overlapping end member, and wherein said removable mounting means comprises:
    a first fastening means attached adjacent the free ends of said cover; and
    a second fastening means mounted to the overlapping end members, wherein the first fastening means is covered by the overlapping end member and held in place by said second fastening means.

6. An apparatus as recited in claim 5, wherein said first fastening means is a zipper.

7. An apparatus as recited in claim 3, wherein said apparatus includes an improved steering means comprising:
    a pair of caster wheels;
    a gear plate formed on each caster wheel;
    an endless chain connected between each caster wheel, whereby said wheels rotate free simultaneously in synchronism with each other 360° about their axes.

8. An apparatus as recited in claim 7, wherein said steering means includes:
    a pair of tension sprockets engaging said chain; and
    a steering post attached to at least one caster wheel to allow said caster wheels to be rotated.

* * * * *